United States Patent
Hassan et al.

(10) Patent No.: US 6,810,251 B2
(45) Date of Patent: Oct. 26, 2004

(54) TRIGGERED HYPERBAND SCANNING

(75) Inventors: Hassan I. Hassan, Apex, NC (US); Keith W. Anderson, Durham, NC (US); David Hoover, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 579 days.

(21) Appl. No.: 09/802,256

(22) Filed: Mar. 8, 2001

(65) Prior Publication Data

US 2003/0022670 A1 Jan. 30, 2003

(51) Int. Cl.$^7$ ................................................ H04Q 7/20
(52) U.S. Cl. ...................... 455/434; 455/432.1; 455/450
(58) Field of Search .............................. 455/434, 432.1, 455/435.1, 436, 450, 452.1, 452.2, 422.1, 433, 77

(56) References Cited

U.S. PATENT DOCUMENTS

| | | | | |
|---|---|---|---|---|
| 5,014,314 A | * | 5/1991 | Mulford et al. ................ | 380/43 |
| 5,471,660 A | * | 11/1995 | Masaki ..................... | 455/161.2 |
| 5,710,973 A | * | 1/1998 | Yamada et al. ............. | 455/434 |
| 6,259,915 B1 | * | 7/2001 | Raith .......................... | 455/434 |
| 6,397,064 B1 | * | 5/2002 | Bridges et al. ........... | 455/432.3 |
| 6,611,678 B1 | * | 8/2003 | Zweig et al. ............. | 455/161.3 |
| 6,615,043 B1 | * | 9/2003 | van de Berg ............... | 455/434 |
| 6,654,597 B1 | * | 11/2003 | Boelter et al. .............. | 455/334 |

* cited by examiner

Primary Examiner—Charles Appiah
Assistant Examiner—Nighi H. Ly
(74) Attorney, Agent, or Firm—Coats & Bennett, P.L.L.C.

(57) ABSTRACT

A method of controlling a mobile terminal allows it to search for possibly higher priority service providers in response to receiving an indication that more than the default number of service providers is available in a given service area, without dropping its current radio channel. When only the standard number of service providers is available in a given area, the mobile terminal uses standard frequency bands and corresponding radio channel allocations during scanning operations. When more than the standard number of service providers is available, the mobile terminal uses received information defining the non-standard spectrum allocation supporting the available service providers in its scanning operations. In a wireless communication system operating in accordance with TIA/EIA-136 standards, the mobile terminal may scan its current hyperband, alternate hyperband, or both the current and the alternate hyperbands (e.g., 800 MHz and 1900 MHz hyperbands), for higher priority service providers.

27 Claims, 9 Drawing Sheets

TRIGGERED HYPERBAND SCANNING

BACKGROUND OF THE INVENTION

The present invention relates to wireless communications in general, and, in particular, relates to techniques for managing mobile terminal operations in multiple service provider areas.

Growth in consumer demand for wireless communication services continues unabated. This consumer demand drives technological innovation as service providers search for ways to support rapidly growing number of customers competing for the finite bandwidth available to the service providers. The demand also stimulates the creation of new service providers, and compels existing service providers to compete for customers within the same service areas.

The intelligent roaming provisions within the TIA/EIA-136 standard govern the manner in which a given mobile terminal acquires or changes service from one service provider to the next. Service providers are generally ranked in terms of priority, with the overall scheme being that the mobile terminal uses the highest priority service provider available. The service provider from whom a given user contracted for wireless service is normally considered that user's "home" service provider. The home provider may have arrangements with other service providers, called "partner" service providers, which permit its users to access a partner service provider's network in areas where the home service provider does not provide coverage. Other typical service provider categories include favored, neutral, and forbidden, with such designations being descriptive of the priorities the user's mobile terminal should apply when attempting to secure service in a given coverage area.

Often, multiple service providers operate within a given coverage area. When mobile terminal users operate their mobile terminals in such areas, their mobile terminals face the challenge of acquiring and maintaining service from the most appropriate service provider operating within the area. The number of service providers operating within a given coverage area can be significant. For example, the TIA/EIA-136 standard defines digital cellular telephone service for both the 800 MHz and 1900 MHz spectrums. The 800 MHz spectrum, referred to as the 800 MHz hyperband, has two standard bands, A and B. The 1900 MHz spectrum, referred to as the 1900 MHz hyperband, has six standard bands, A–F. A number of standard radio channels (frequencies) are included in each of the standard bands within these hyperbands.

Normally, in a given geographic area, there are up to two different service providers in the 800 MHz hyperband, each occupying one of the two standard 800 MHz bands. Similarly, within the same service area, there are up to six different service providers in the 1900 MHz hyperband, each occupying one of the six standard 1900 MHz bands. However, the TIA/EIA-136 standard permits up to 64 different service providers to operate in each of the hyperbands. In these circumstances, each service provider is allocated a certain number of the standard radio channels within the hyperband in which they operate. The TIA/EIA-136 standard defines a Regulatory Control Message that informs mobile terminals within the service area as to whether the standard bands within the hyperband in which the mobile terminal operates are further subdivided to support more than the standard number of carriers.

BRIEF SUMMARY OF THE INVENTION

The present invention is a system and method for controlling a mobile terminal such that it seeks the highest priority service provider available in an area served by multiple service providers, without dropping its current service connection. In stand-by, the mobile terminal camps on a service provider control channel. The mobile terminal monitors control channel information for an indication that the standard bands of the current hyperband are redefined to support additional service providers. Upon such indication, and if not already camped on the mobile terminal's home service provider, the mobile terminal begins background scanning operations. Background scanning allows the mobile terminal to look for the highest priority service provider available, without dropping its current control channel. The scanning process is interruptible and transparent to the user of the mobile terminal.

In a TIA/EIA-136 environment, the mobile terminal operates in a given one of the 800 MHz and 1900 MHz hyperbands, and camps on a digital control channel (DCCH) if available. Extended Broadcast Channel (E-BCCH) information indicates whether the standard bands within the current hyperband redefined configured to support more than customary one service provider per standard band. This information comes in the form of a Regulatory Control Indicator (RCI) included in an associated Regulatory Control Message. If the RCI indicates that the standard bands within the current hyperband are redefined, it also contains additional information about how the standard radio channels within the current hyperband are allocated to the available service providers.

With this channel allocation information for the current hyperband, the mobile terminal may begin background scanning of the current hyperband for higher priority service providers, and may additionally do a background check of the other hyperband to determine the standard bands of the other hyperband are also redefined to support multiple service providers. If the alternate hyperband also provides two or more service providers within one or more of its standard bands, i.e., its standard bands have been redefined, the mobile terminal may extend background scanning operations to the other hyperband to see if a higher priority service provider is available within it.

DETAILED DESCRIPTION OF THE INVENTION

In operation, mobile terminals 100 seek service from the highest priority service provider available in the service area where the mobile terminal 100 is operating. As such, the present invention is applicable to wireless communication systems based on a variety of standards. The following detailed description discusses the present invention in the context of wireless communication systems based on the TIA/EIA-136 standard. Primarily a North American standard, TIA/EIA-136 defines 800 MHz and 1900 MHz hyperbands that provide digital cellular services based on Time-Division Multiple Access (TDMA) techniques. In North America, the 1900 MHz TIA/EIA-136 service is typically referred to as Personal Communications Services or PCS.

The present invention is also applicable to a variety of other wireless communication standards, such as Global System for Mobile communications (GSM), which is another TDMA-based standard. GSM is primarily a European standard, defining digital cellular services at 800 MHz. In North America, GSM service is typically implemented at 1900 MHz and referred to as 1900 MHz Digital Cellular Service or DCS.

The present invention has further applicability beyond TDMA-based systems, such as those wireless communication standards based on Code-Division Multiple Access (CDMA) techniques, including both current and developing CDMA-based standards. In North America, IS-95 represents an established digital cellular services standard, and CDMA2000 and CDMAONE represent developing third-generation standards.

Figure 1:
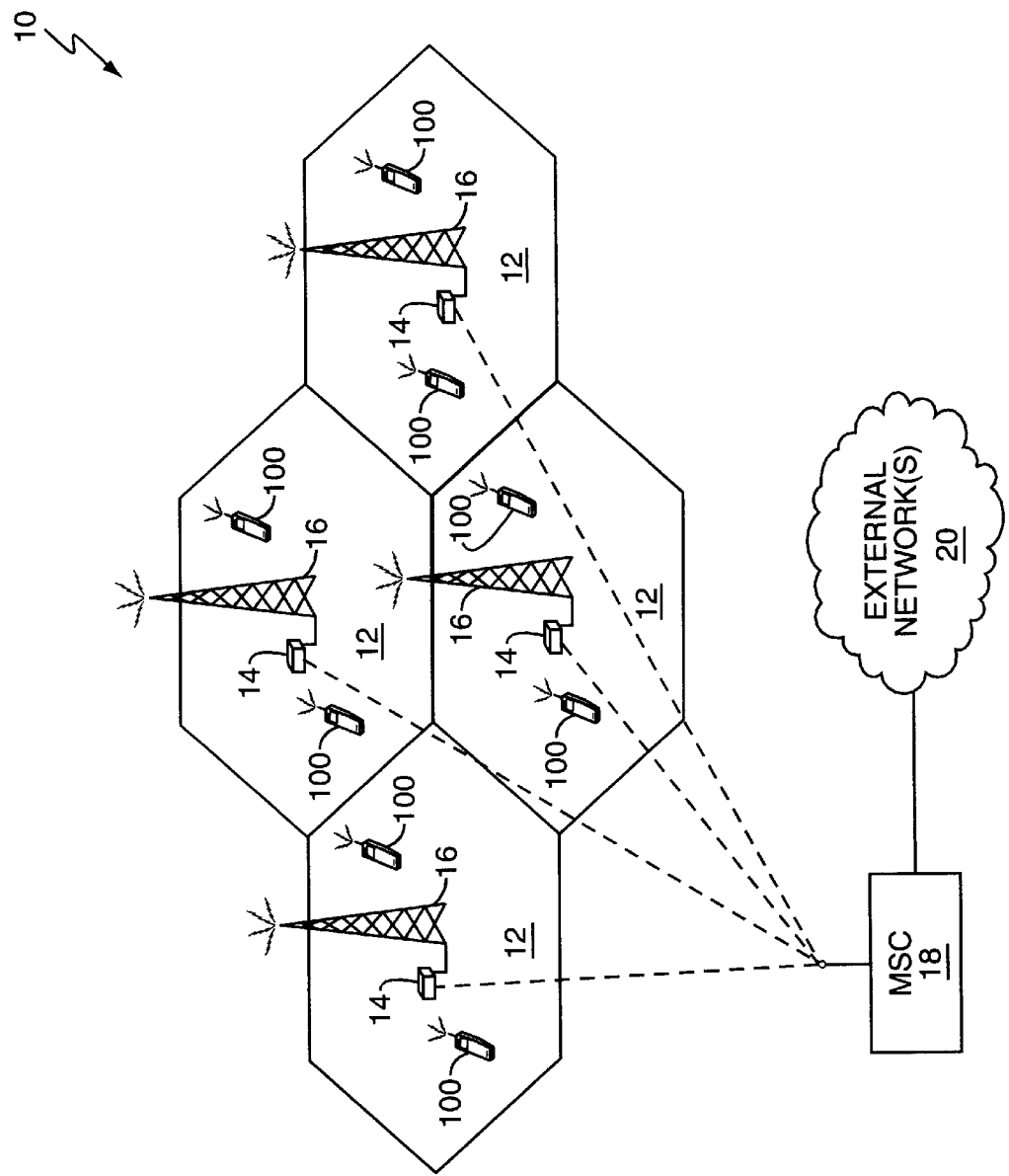
FIG. 1 is a diagram of a wireless communication system.

FIG. 1 illustrates a wireless communication system generally indicated by the numeral 10. A given geographic region is divided into a plurality of coverage areas, called cells 12. Each cell 12 includes at least one base station 14 and associated transmit/receive antenna 16. The base stations 14 interconnect with at least one mobile switching center (MSC) 18. The MSC 18 interconnects with one or more external networks 20, such as the Public Switched Telephone Network (PSTN), an Integrated Services Digital Network (ISDN), or with the Internet. Mobile terminals 100 operate within each cell 12, and are free to move across cells 12, a concept known as "roaming." Note that multiple service providers (SPs) operating within a given service area may each establish one or more cells 12 within the service area, and may define cells 12 that physically overlap those of another SP.

Many different functions within the mobile terminal 100 are needed to support roaming. However, always seeking service from the most appropriate SP represents the underlying impetus behind roaming operations from the mobile terminal's perspective. Several categories are used to characterize service providers, and these categories in descending order of priority include:

- Home SP—the SP from which the mobile terminal contracts for service and regarded as the highest priority SP. Home SP information is generally stored in the mobile terminal 100.
- Partner SP—SPs that have preferred use agreements with the mobile terminal user's home SP and are regarded as having the second highest priority. Partner SP information is generally stored in the mobile terminal 100.
- Favored SP—SPs that are acceptable for use when home or partner SPs are not available. Favored SP information is generally stored in the mobile terminal 100.
- Neutral SP—SPs that are acceptable for use when no higher SPs are available (i.e., no Home, Favored, or Partner SPs). Generally, Neutral SP information is not stored in the mobile terminal 100.
- Forbidden SP—SPs from which the mobile terminal is forbidden to acquire service. Forbidden SP information is generally stored in the mobile terminal 100. The mobile terminal 100 uses a forbidden SP only in an emergency call when no other SP is available.

Generally, the mobile terminal 100 is configured by default to acquire service on channels within one of the standard bands in either the 800 MHz or 1900 MHz hyperband. Only one SP operates in each of the standard bands within a given service area and roaming becomes a matter of managing "hand-off" as the mobile terminal 100 moves from cell-to-cell. Hand-off refers to the process of transitioning the mobile terminal 100 from one cell's base station 14 to a neighboring base station 14, as the mobile terminal 100 moves from the current cell 12 into the neighboring cell 12. Multiple SPs may operate within the same general service area, with each SP establishing one or more cells 12 or sets of cells 12 within that service area. Geographically, the cells 12 of one SP may overlap those of another SP. To coexist in this fashion, these multiple service providers are assigned different bands within one or both of the hyperbands used in the service area.

As earlier noted the 800 MHz hyperband includes two standard or default bands, while the 1900 MHz hyperband has six standard bands. Thus, for a given geographic region or service area, the 800 MHz hyperband with its two standard bands can support up to twp SPs. Similarly, the 1900 MHz hyperband can support up to six SPs within the service area, based on its six standard bands.

Information in the Regulatory Control Message defined by the TIA/EIA-136 allow these limits to be exceeded. Each hyperband may be redefined to include up to 64 bands, with each of the redefined bands supporting a different SP. In this manner, each hyperband supports up to 64 different SPs within the same service area.

The TIA/EIA-136-123-B standard in particular provides details for how multiple SPs operate within the same service area, and provides detailed information regarding how the hyperands are redefined to support additional SPs. The TIA/EIA-136-A and -B standards are both herein incorporated in their entirety by reference. Table 1 below depicts standard (default) band and channel definitions for the 800 MHz hyperband defined by the TIA/EIA-136 standard.

TABLE 1

Standard 800 MHz Band/Channel Allocations for 30 KHz Bearer Channel

| System | Bandwidth (MHz) | Number of Channels | Boundary Channel | Transmitter Center Frequency (MHz) Number | |
|---|---|---|---|---|---|
| | | | | Mobile | Base |
| (Not used) | | 1 | (990) | (824.010) | (869.010) |
| A" | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| | | | 667 | 845.010 | 890.010 |
| A' | 1.5 | 50 | 716 | 846.480 | 891.480 |
| B' | 2.5 | 83 | 717 | 846.510 | 891.510 |
| | | | 799 | 848.970 | 893.970 |

Table 2 below provides standard (default) band and channel allocations for the 1900 MHz spectrum defined by TIA/EIA-136.

TABLE 2

Standard 1900 MHz Band/Channel Allocations for 30 KHz Bearer Channel

| System | Bandwidth (MHz) | Number of Channels | Boundary Channel | Transmitter Center Frequency (MHz) Number Mobile | Base |
|---|---|---|---|---|---|
| (Not used) |  | 1 | 1 | 1850.010 | 1930.050 |
| A | 15 | 497 | 2 | 1850.040 | 1930.080 |
|  |  |  | 498 | 1864.920 | 1944.960 |
| A, D |  | 1 | 499 | 1864.950 | 1944.990 |
| A, D |  | 1 | 500 | 1864.980 | 1945.020 |
| A, D |  | 1 | 501 | 1865.010 | 1945.050 |
| D | 5 | 164 | 502 | 1865.040 | 1945.080 |
|  |  |  | 665 | 1869.930 | 1949.970 |
| D, B |  | 1 | 666 | 1869.960 | 1950.000 |
| D, B |  | 1 | 667 | 1869.990 | 1950.030 |
| B | 15 | 498 | 668 | 1870.020 | 1950.060 |
|  |  |  | 1165 | 1884.930 | 1964.970 |
| B, E |  | 1 | 1166 | 1884.960 | 1965.000 |
| B, E |  | 1 | 1167 | 1884.990 | 1965.030 |
| E | 5 | 165 | 1168 | 1885.020 | 1965.060 |
|  |  |  | 1332 | 1889.940 | 1969.980 |
| E, F |  | 1 | 1333 | 1889.970 | 1970.010 |
| E, F |  | 1 | 1334 | 1890.000 | 1970.040 |
| F | 5 | 164 | 1335 | 1890.030 | 1970.070 |
|  |  |  | 1498 | 1894.920 | 1974.960 |
| F, C |  | 1 | 1499 | 1894.950 | 1974.990 |
| F, C |  | 1 | 1500 | 1894.980 | 1975.020 |
| F, C |  | 1 | 1501 | 1895.010 | 1975.050 |
| C | 15 | 497 | 1502 | 1895.040 | 1975.080 |
|  |  |  | 1998 | 1909.920 | 1989.960 |
| Not Used |  | 1 | 1999 | 1909.950 | 1989.990 |

The above Tables 1 and 2 band and channel allocations represent standard band/channel definitions used by the mobile terminal 100 to look for SPs within the 800 MHz or 1900 MHz hyperbands.

Figure 2:
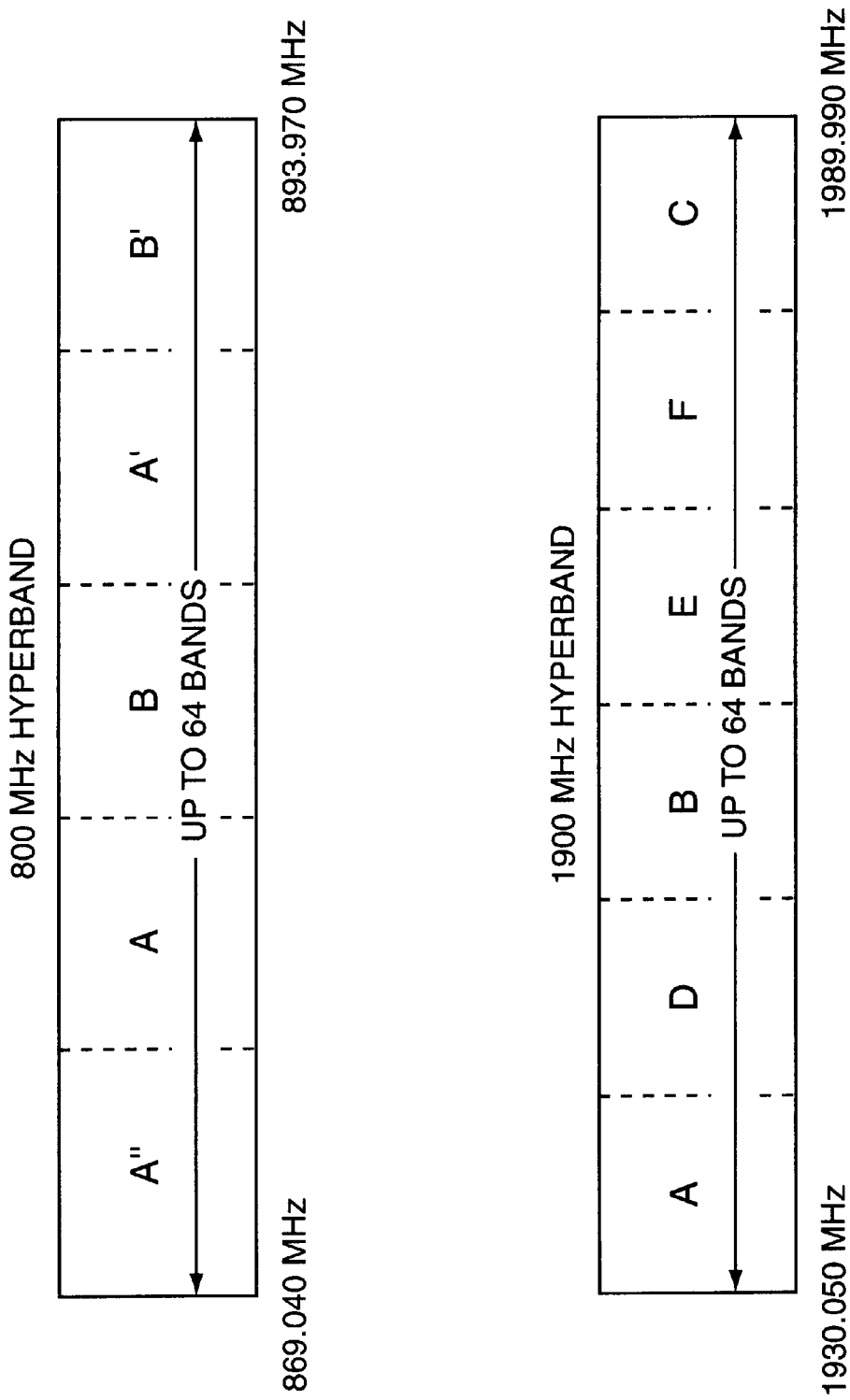
FIG. 2 is a diagram of 800 MHz and 1900 MHz hyperbands in a TIA/EIA-136 configuration of the wireless communication system of FIG. 1.

FIG. 2 illustrates the 800 MHz and 1900 MHz hyperbands. The hyperbands are shown divided into their standard bands. Default, standardized RF channel assignments exist for each of these standard bands. The Regulatory Control Message discussed above provides information defining how a given one of the hyperbands is redefined. This redefinition involves redefining the bands within the hyperband, with the ability to define up to 64 bands, thereby supporting more than the standard number of SPs within a given service area. The redefinition information further identifies which of the RF channels defined for the hyperband are assigned to which of the up to 64 bands.

The Regulatory Control Message, or the like, alerts mobile terminals 100 as to whether a current hyperband in which the mobile terminal 100 is operating is based on the standard bands or redefined bands supporting more than the standard number of SPs. Other wireless communication standards referred to herein may have similar notification messages. The Regulatory Control message includes a Regulatory Control Indicator (RCI) that indicates to the mobile terminal 100 how many SPs are within a given service area. A RCI value of one (1) indicates that the current hyperband uses the standard spectrum allocation. A RCI value of zero (0) indicates that the current hyperband uses a non-standard spectrum allocation to support more than the standard number of SPs. The non-standard spectrum allocation includes redefined bands within the hyperband, and corresponding redefined RF channel allocations. Table 3 below, taken from Section 4.1.3.1 of TIA/EIA-136-123-B, depicts typical band and channel allocations for service in the 800 MHz hyperband for RCI=0, with four SPs in the hyperband.

TABLE 3

TIA/EIA-136 800 MHz Hyperband, RCI = 0 with Four SPs

| Field | Value |
|---|---|
| Parameter Type (RF Channel Allocation) | 1 |
| Number of Channel Groups | 4 |
| Channel Group 1 | 991 |
|  | 175 |
| Channel Group 2 | 176 |
|  | 383 |
| Channel Group 3 | 384 |
|  | 591 |
| Channel Group 4 | 592 |
|  | 799 |

Table 4 below, also from TIA/EIA-136-123-B, depicts the 1900 MHz hyperband for RCI=0, with four SPs in the hyperband.

TABLE 4

TIA/EIA-136 1900 MHz Hyperband, RCI = 0 with Four SPs

| Field | Value |
|---|---|
| Parameter Type (RF Channel Allocation) | 1 |
| Number of Channel Groups | 4 |
| Channel Group 1 | 2 |
|  | 500 |
| Channel Group 2 | 501 |
|  | 1000 |
| Channel Group 3 | 1001 |
|  | 1500 |
| Channel Group 4 | 1501 |
|  | 1998 |

For the 800 MHz hyperband, each SP is assigned a channel group containing a given number of potentially non-contiguous, standard 800 MHz RF channels. For each channel group of sixteen or more channels, each channel group is divided into sixteen so-called probability blocks. Each probability block within a channel group has a known probability weight that can be used by the mobile terminal 100 when scanning that channel group to prioritize its channel scanning. Similarly, within the 1900 MHz hyperband, each service provider is assigned a group of potentially non-contiguous, standard 1900 MHz RF channels. Each channel group of seven or more channels is divided into seven sub-bands, with each sub-band assigned a scanning priority. The mobile terminal 100 uses sub-band scanning priorities to optimize channel scanning within the 1900 MHz hyperband.

Figure 3:
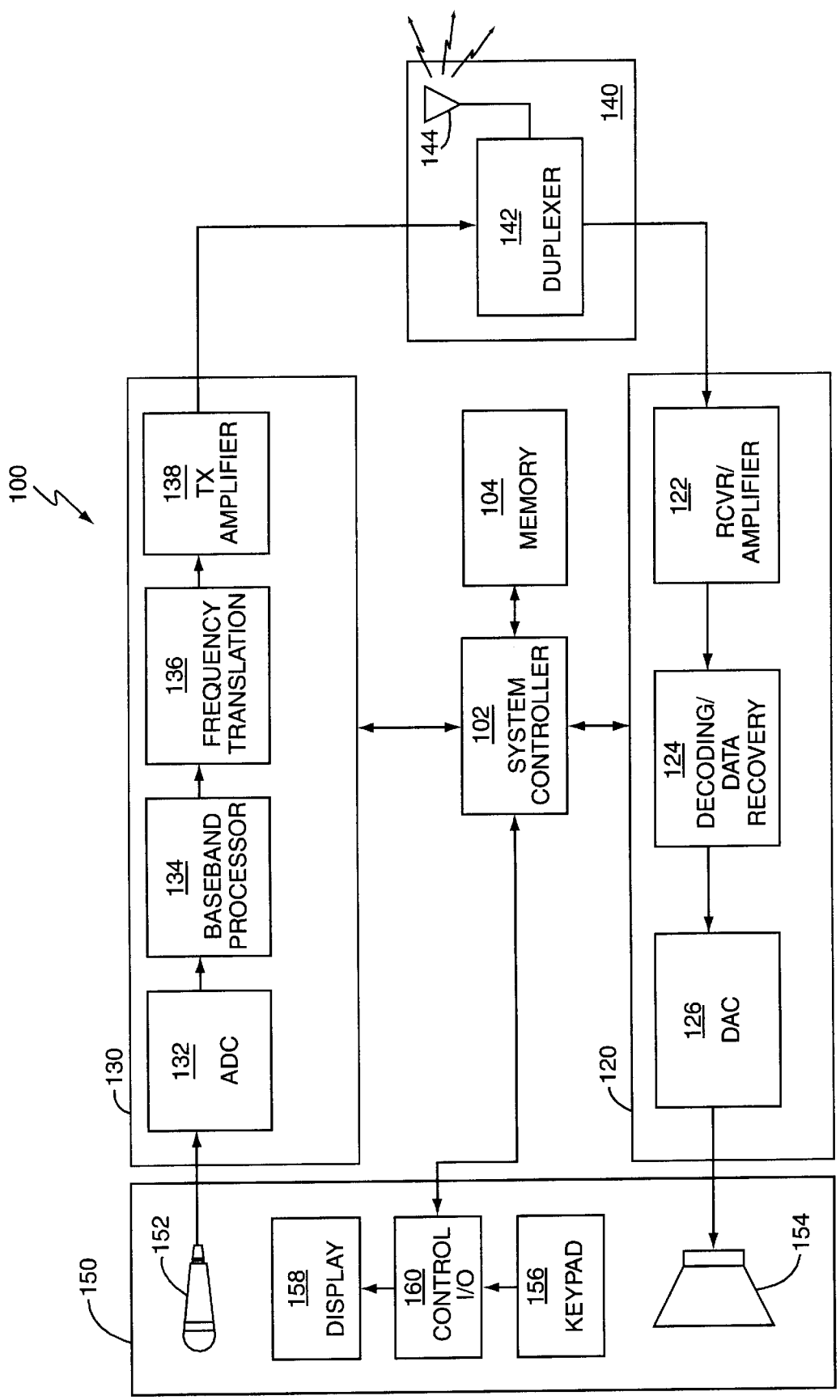
FIG. 3 is a diagram of the mobile terminal introduced in the wireless communication system of FIG. 1.

Against this backdrop of multiple SPs operating within the same service area, it is useful to describe the mobile terminal 100 in more detail, and look in particular at certain stored information used by the mobile terminal 100. FIG. 3 is a diagram of the mobile terminal 100 used in the wireless communication system 10. The mobile terminal 100 includes a system controller 102 and associated memory 104, a receiver 120, a transmitter 130, a duplexer/antenna 140, and a user interface 150.

In operation, the mobile terminal 100 sends and receives information via radio frequency signaling between it and the current base station 12. The system controller 102 is typically implemented as one or more microcontrollers (MCUs) that manage the user interface 150, and provide overall control of the mobile terminal 100. The memory 104 generally includes application software, default values for constants used in operation, and working space for data that is explained later in more detail.

The user interacts with the mobile terminal 100 via the user interface 150. The microphone 152 converts user speech signals into a corresponding analog signal, which is provided to the transmitter 130 for subsequent conversion, processing, and transmission to the remote base station 14 via the duplexer/antenna 140. The receiver 120 receives signals from the remote base station 14 and extracts received audio information, e.g., speech from a remote user, and provides an audio signal for driving a speaker 154 included in the user interface 150. The user interface 150 further includes a keypad 156 for accepting commands and data input from the user, and a display 158 for providing visual information to the user. In short, the user interface 150 allows the user to send and receive speech and other audio information, to dial numbers, and to enter other data as needed.

The receiver 120 includes a receiver/amplifier 122, a decoding/data recovery module 124, and a digital-to-analog converter (DAC) 126. In operation, signals are received via the antenna 144, and the duplexer 142 provides signal isolation between received and transmitted signals. Received signals are routed to the receiver amplifier 122, which provides conditioning, filtering, and down conversion of the received signal. In digital implementations, the receiver/amplifier 122 may use analog-to-digital converters (ADCs) to provide the decoding/data recovery module 124 with successive digital values corresponding to the incoming received signal. The decoding/data recovery module 124 recovers the audio information encoded in the received signal, and provides the DAC 126 with digital values corresponding to the received audio information. In turn, the DAC 126 provides an analog output signal suitable for driving the speaker 154.

The transmitter 130 includes an ADC 132, a baseband processor 134, a frequency translation module 136, and a transmit amplifier 138 configured in accordance with the present invention. In operation, the ADC 132 converts analog speech signals from the microphone 152 to corresponding digital values. The baseband processor 134 processes and encodes these digital values, providing error correction encoding and translation into a format suitable for frequency translation modulation in the frequency translation module 136. The frequency translation module 136 provides the transmit amplifier 138 with a modulated signal that is amplified by the transmit amplifier 138 to form the transmit signal emitted by the antenna 144.

The memory 104 may include the IRDB or similar roaming configuration information discussed above. The IRDB organization defined by TIA/EIA-136-123-B appears in Table 5.

TABLE 5

TIA/EIA-136 Intelligent Roaming Database

| Field | Meaning |
| --- | --- |
| IR Control Data Word | See Table 4. |
| Band Order - Band 1 | Specifies the 800 MHz or 1900 MHz band to be scanned first. |
| Band Order - Band 2 | Specifies the 800 MHz or 1900 MHz band to be scanned second. |
| Band Order - Band 3 | Specifies the 800 MHz or 1900 MHz band to be scanned third. |
| Band Order - Band 4 | Specifies the 800 MHz or 1900 MHz band to be scanned fourth. |
| Band Order - Band 5 | Specifies the 800 MHz or 1900 MHz band to be scanned fifth. |
| Band Order - Band 6 | Specifies the 800 MHz or 1900 MHz band to be scanned sixth. |
| Band Order - Band 7 | Specifies the 800 MHz or 1900 MHz band to be scanned seventh. |
| Band Order - Band 8 | Specifies the 800 MHz or 1900 MHz band to be scanned eighth. |

TABLE 5-continued

TIA/EIA-136 Intelligent Roaming Database

| Field | Meaning |
| --- | --- |
| NUM_PARTNER_SOC | The number of Partner SOCs in the Partner SOC list. |
| Partner SOC list | A list of partner SOCs. |
| NUM_PARTNER_SID | The number of Partner SIDs in the Partner SID list. |
| Partner SID list | A list of partner SIDs. |
| NUM_FAVORED_SOC | The number of Favored SOCs in the Favored SOC list. |
| Favored SOC list | A list of favored SOCs. |
| NUM_FAVORED_SID | The number of Favored SIDs in the Favored SID list. |
| Favored SID list | A list of favored SIDs. |
| NUM_FORBIDDEN_SOC | The number of Forbidden SOCs in the Forbidden SOC list. |
| Forbidden SOC list | A list of forbidden SOCs. |
| NUM_FORBIDDEN_SID | The number of Forbidden SIDs in the Forbidden SID list. |
| Forbidden SID list | A list of forbidden SIDs. |
| NUM_CELLULAR | The number of 800 MHz probability blocks to scan. |
| NUM_PCS | The number of 1900 MHz sub-bands to scan. |
| RESCAN_COUNT | Defines the interval between Triggered Partial Scans in Hyperframes. |
| RESCAN_LOOP | Controls the number of times to perform a Triggered Partial Scan before performing a Triggered Wide-band Scan. |
| HISTORY_THRESHOLD | The minimum received signal strength threshold used in scanning DCCH History Table entries. |
| NUM_DHT | The number of entries in the DCCH History Table. |
| NUM_BHT | The number of entries in the Band History Table. |
| Sub-band Priority Order | For each 1900 band, the order in which sub-bands are scanned. |

Section 1 of TIA/EIA-136-005-A provides a comprehensive list of definitions for the many acronyms relevant to the standard.

Table 6 illustrates a typical configuration for the Intelligent Roaming Control Word introduced in Table 5 above. In other standards, such as GSM or IS-95, similar roaming configuration provisions may apply.

TABLE 6

TIA/EIA-136 Intelligent Roaming Control Word

| Bit | Label | Meaning |
| --- | --- | --- |
| 0 (LSB) | Home Only Enable | When this bit is set to 0, the mobile station shall use the SOC/SID list specified in the IRDB along with the NAM when searching for service, and shall obtain service from a Neutral SP if no higher priority SPs are found. When this bit is set to 1, the mobile station shall use only the HOME_SID or HOME_SOC specified in the NAM when searching for service and reject all other SPs. |
| 1 | DHT Enable | When this bit is set to 0 the mobile station does not include the DHT entries as part of the Power-up Scan. When this bit is set to 1 the mobile station scans DHT entries during the Power-up Scan. |

TABLE 6-continued

TIA/EIA-136 Intelligent Roaming Control Word

| Bit | Label | Meaning |
|---|---|---|
| 2 | Alpha Tag Enable | When this bit is set to 0, the broadcast Alphanumeric SID shall never be displayed. When this bit is set to 1, the broadcast Alphanumeric SID shall be displayed if available. Any alpha tags associated with PSID or RSID with which the mobile station is registered shall always take precedence over other alpha tags. |
| 3 | SOC Disable | When the SID and the SOC of a particular SP are matched at different priority levels within the IRDB or NAM, the SOC Disable bit determines which classification shall take precedence. When this bit is set to 0, the highest priority classification of either the SID or the SOC shall take precedence. When this bit is set to 1, the SID priority shall take precedence. |
| 4 | Enhanced IR Enable | When the bit is set to 0, DHT entries are not stored for Favored and Neutral SPs. The MRS is not used. The mobile station shall scan all channels in the DHT and all bands in the IRDB Band Order list to find a higher priority SP before accepting service from a Favored or Neutral SP. When the bit is set to 1, DHT entries are stored for Favored and Neutral SPs. The mobile station may obtain service from a Favored SP if one is found while examining the DHTs during a Power-up Scan. The mobile station may end a Wide-band Scan if the mobile station identifies a Favored SP which has a BHT match. The MRS is used during Power-up Scans. The mobile station may obtain service from a Neutral SP with an MRS match, if one is found while examining the DHTs during a Power-up Scan. |
| 5 | Triggered Scan Disable | When this bit is set to 0, Triggered Scanning is enabled anytime the mobile station is operating on a Favored or Neutral SP. When this bit is set to 1, Triggered Scanning is disabled while the mobile station is operating on a Favored SP. |
| 6 | Non-Public Priority | When this bit is set to 0, the mobile station shall obtain service on the highest priority SP according the SID and SOC information. When this bit is set to 1, a mobile station may obtain service from a SP with a matching PSID/RSID, regardless of the priority of the SP's SID and SOC. |
| 7 (MSB) | Reserved | Reserved for future use. |

While the IRDB is generally configured in accordance with the standard 800 MHz and 1900 MHz spectrum and channel allocations shown in Tables 1 and 2, the Regulatory Control Message provides hyperband information that redefines these standard channel allocations for a particular service area.

Within a given cell 12, the mobile terminal 100 acquires service from the SP providing service in that cell 12. With the Advanced Mobile Phone System (AMPS) analog service in the 800 MHz spectrum, the mobile terminal 100 seeks out and finds the strongest or best analog control channel (ACC) within the current cell 12. Under TIA/EIA-136 the mobile terminal 100 acquires service on a digital control channel (DCCH) in either the 800 MHz or 1900 MHz spectrums, depending upon which spectrums are available within the cell 12. When the mobile terminal 100 is on but not in active use, it either "camps" on a DCCH or maintains an idle state on an ACC, and this is generally referred to as camping unless otherwise distinguished.

Scanning techniques included in the present invention are presented as background tasks, occurring transparently with regard to the user of the mobile terminal 100. Within a given service area (cell 12), the mobile terminal 100 acquires service from a given SP on a control channel broadcast by that SP. The control channel may be digital (e.g., a DCCH), or analog (e.g., an ACC). In either case, when the mobile terminal 100 is not active it either camps on the DCCH or maintains an idle state on the ACC.

Figure 4:
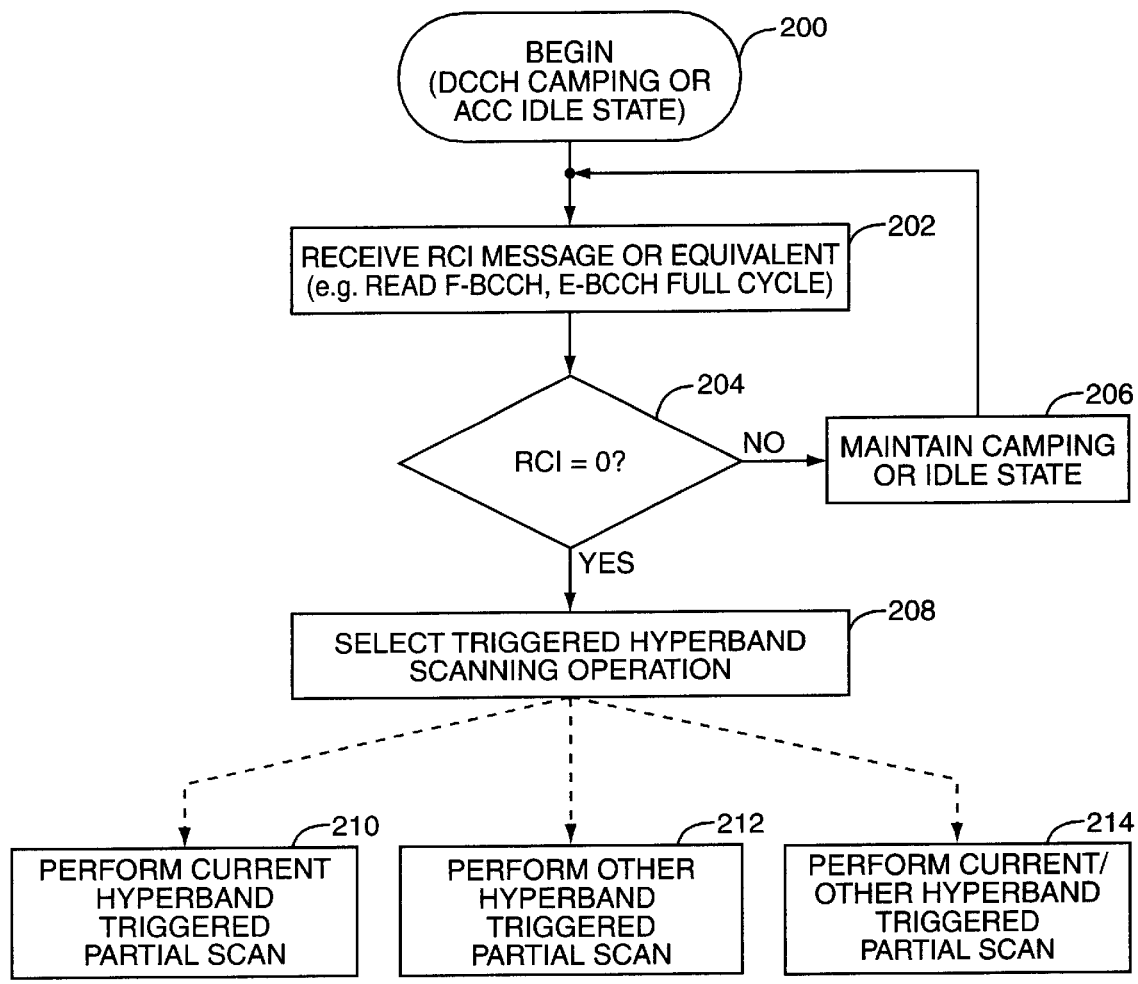
FIG. 4 is a logic flow diagram for overall hyperband scanning operations in accordance with the present invention.

FIG. 4 is a flow diagram illustrating top-level scanning operations for the mobile terminal 100. Processing begins (block 200) with the mobile terminal 100 camping on the current control channel transmitted by the current SP. The mobile terminal 100 receives a message indicating that the current hyperband uses a non-standard spectrum allocation (block 202). In a TIA/EIA-136 system, this message is the Regulatory Control Message introduced earlier. Equivalent messages may be used in other standards.

If RCI does not equal 0 (e.g., RCI=1), the current hyperband uses the standard spectrum allocation (default bands and channel allocations) and the mobile terminal 100 maintains camping on the current control channel (block 206). However, if RCI=0, more than the standard number of SPs are available, and the mobile terminal 100 will perform hyperband triggered scanning as defined herein.

Several options regarding this hyperband scanning are available. The mobile terminal 100 may be configured to perform a triggered partial scan of the current hyperband (block 210), to perform a triggered partial scan of another available hyperband (block 212), or to do a combined scan of the current hyperband and other hyperbands (block 214). In this context the "current hyperband" is the hyperband, either the 800 MHz or the 1900 MHz hyperband, the mobile terminal 100 was operating in when it received the RCI=0 message. Selection of the scanning procedure to be undertaken may be based on current or default information.

It is not necessary to include all of these options within the mobile terminal 100. For example, the mobile terminal 100 might perform only scanning of the current hyperband (block 210), only perform scanning of other hyperbands (block 212), or might always perform the combined hyperband scanning (block 214).

Figure 5:
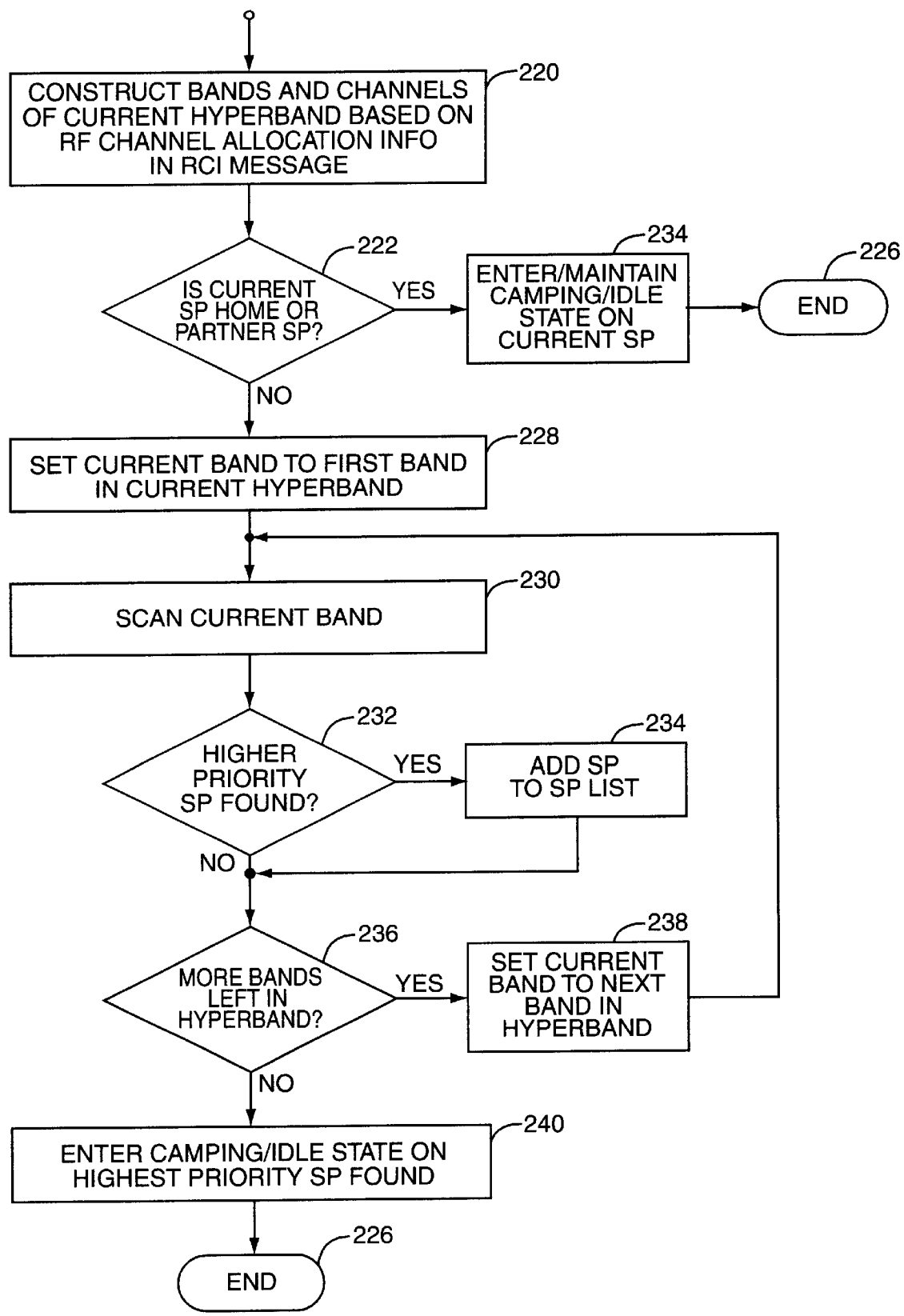
FIG. 5 is a logic flow diagram for the current hyperband scanning operations introduced in FIG. 4.

FIG. 5 is a flow diagram of Current Hyperband Triggered Partial Scan operations (FIG. 4, block 210). The mobile terminal 100 uses the information received in the Regulatory Control Message or its equivalent to construct the non-standard band and channel allocations for the current hyperband (block 220). Note that the mobile terminal 100 may reorganize the current information in the IRDB in accordance with the received channel allocation information and then use the revised IRDB for current hyperband scanning. If the standard IRDB defined a band order, the redefined bands within the current hyperband may be ordered accordingly. As shown in Tables 3 and 4, representing the 800 MHz and 1900 MHz hyperbands respectively, the allocation information provides the mobile terminal 100 with information about how the RF channels are allocated to the SPs operating within the current hyperband.

If the current SP is the mobile terminal's home SP or a partner SP (block 222), the mobile terminal enters or maintains camping on the current control channel (block 224) and the current scanning operations end (block 226). If the current SP is not a home or partner SP (block 222), the mobile terminal 100 sets the current band to the first defined band in the current hyperband (block 228). The mobile terminal 100 scans this current band (block 230), and may use the probability blocks or sub-band channel assignments discussed earlier to prioritize the channel search order in the current band.

For each SP with a higher priority than the current SP found within the current band, the mobile terminal 100 adds the found SP to an SP list maintained for the search (block 234). The mobile terminal 100 may opt to store full information for the found SP, such as control channel number, SOC, or SID. Note that if the found SP is a forbidden SP, the mobile terminal 100 may store such information to skip the forbidden service provider in subsequent scanning operations. If there are more bands left in the current hyperband (block 236), the mobile terminal 100 sets the current band to the next band defined for the hyperband (block 238), and repeats scanning for the current band as above (blocks 230–236).

After all of the bands in the current hyperband are scanned, the mobile terminal 100 selects the highest priority SP from the list of SPs found during the current hyperband triggered partial scan just performed and enters the camping or idle state on the control channel provided by the highest priority SP (block 240) and the current scan ends (block 226). As noted earlier, the mobile terminal 100 performs the above current hyperband triggered partial scan as a background task, in a way that is transparent to the mobile terminal user, and without causing the mobile terminal 100 to drop service with its current service provider. For example, if the mobile terminal 100 was camped on a DCCH from the current service provider at the outset of hyperband scanning, the mobile terminal's hyperband scanning operations are executed between its periodic monitoring of the DCCH for paging messages, and other such DCCH information.

Figure 6A:
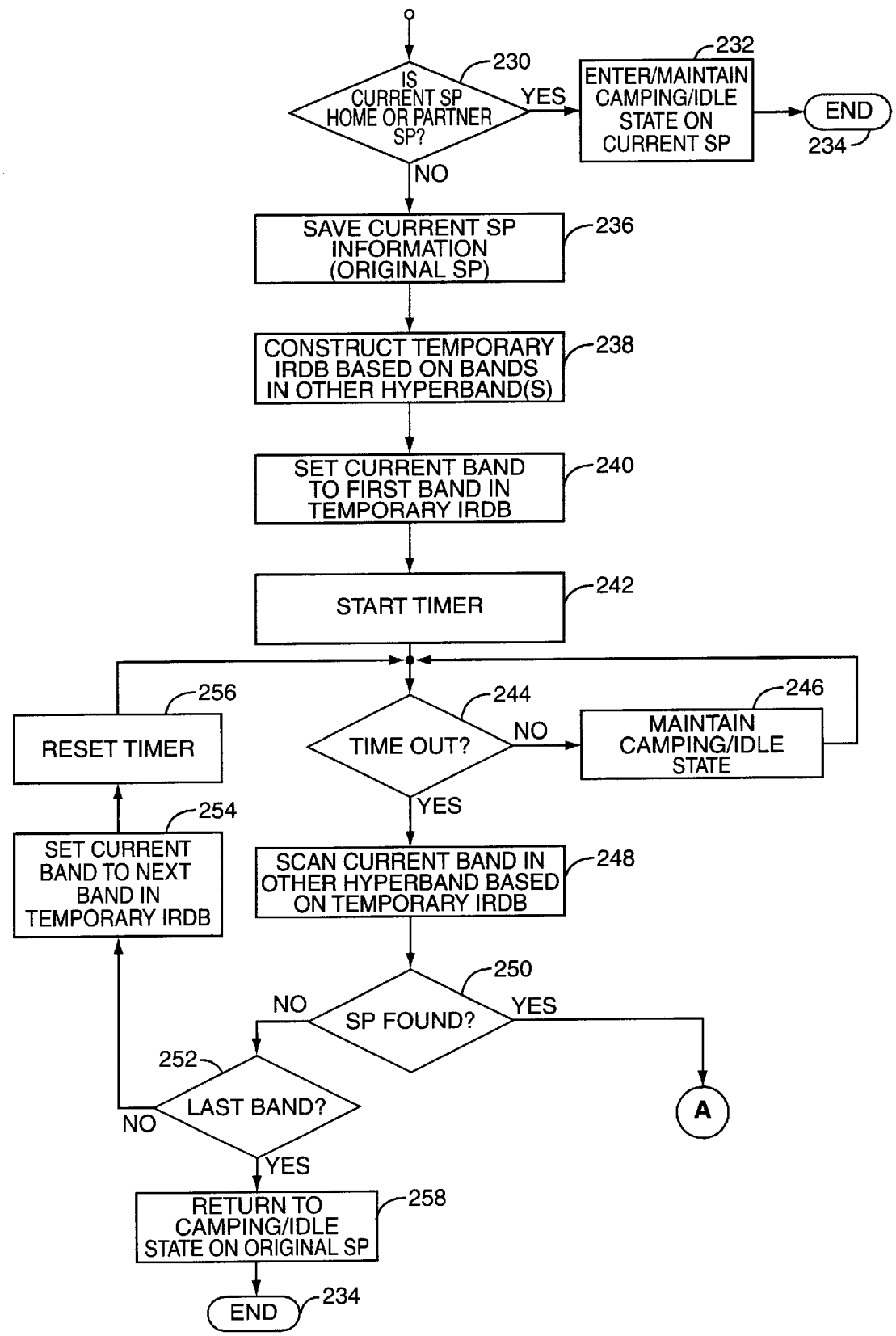
FIGS. 6A and 6B are logic flow diagrams for the other hyperband scanning operations introduced in FIG. 4.
Figure 6B:
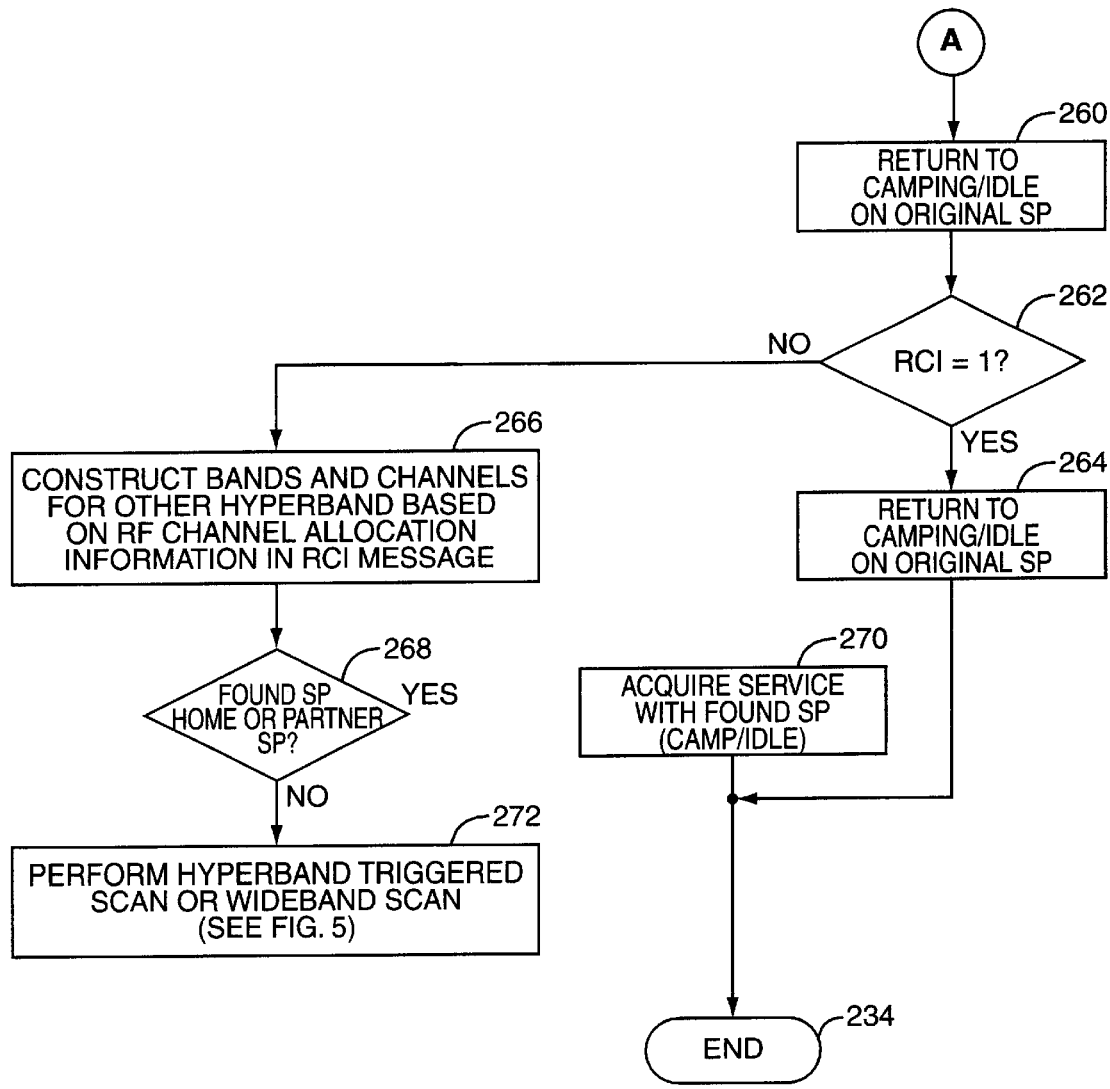

FIGS. 6A and 6B are flow diagrams of Other Hyperband Triggered Partial Scanning operations (FIG. 4, block 212). In this scan, the mobile terminal 100 receives an RCI=0 message or its equivalent, which means that the mobile terminal's current hyperband (either the 800 MHz or 1900 MHz hyperband) uses a non-standard spectrum allocation to support more than the standard number of SPs. If the current hyperband is supporting more than the standard number of SPs, there is reason to infer that the other hyperband might likewise use a non-standard spectrum allocation to support more than the standard number of SPs. The other hyperband may have SPs not available in the current hyperband. On this basis, the mobile terminal 100 may use the RCI=0 message received in the current hyperband as a trigger to scan in the other hyperband, if it exists, to find a higher priority service provider.

Processing begins with the mobile terminal 100 determining whether the current service provider in the current hyperband is a home or partner SP (block 230). If so, the mobile terminal 100 enters or maintains camping on the current control channel associated with that SP (block 232) and the current scan processing ends (block 234). If the current SP on the current hyperband is not a home or partner SP, the mobile terminal 100 saves relevant information for the current SP (block 236) and constructs a temporary IRDB or equivalent information based on the default bands comprising the other hyperbands (block 238). In other words, if the current hyperband is the 800 MHz hyperband, the mobile terminal 100 constructs a temporary IRDB based on the default bands and channel allocations defined for the 1900 MHz spectrum, or vice versa if the current hyperband is the 1900 MHz hyperband.

The mobile terminal 100 then sets, for scanning purposes, the current band to the first band defined by the temporary IRDB for the other hyperband (block 240), and the mobile terminal 100 then starts a timer used to control scanning in the other hyperband (block 242). The mobile terminal 100 maintains service on the current channel from the current SP in the current hyperband (block 246) while waiting for the timer to expire (block 244). Upon expiration of the timer, the mobile terminal 100 scans the current band in the other hyperband (block 248). If the mobile terminal 100 finds a service provider in the current band of the other hyperband (block 250), it receives a Regulatory Control Message from that service provider, for example by waiting to receive a full cycle of the F-BCCH and E-BCCH on a DCCH from the found service provider (block 260).

If the received message indicates that RCI=1, or otherwise indicates that multiple service providers are not available (block 262), the mobile terminal 100 returns to camping on the current control channel of the current SP in the current hyperband (block 264), and processing ends (block 234). If the received message indicates that the other hyperband uses a non-standard spectrum allocation (e.g., RCI=0 for the other hyperband) (block 262), the mobile terminal 100 redefines the bands in the other hyperband in accordance with the non-standard spectrum allocation information received for the other hyperband (block 266). If the found SP is a home or partner SP (block 268), the mobile terminal 100 acquires service from the found SP, and begins camping/idling on a control channel associated with that SP. In effect, then, the mobile terminal 100 changes from camping on the current control channel of the current SP in the current hyperband to camping on the control channel of the higher-priority SP just found in the other hyperband.

If the SP is not a home or partner SP (block 268), the mobile terminal 100 performs a scan of the other hyperband using the RF channel allocation information received for the other hyperband (block 272). Scanning of the other hyperband may be in accordance with the hyperband scanning outlined in FIG. 5, by logically making the other hyperband the "current" hyperband. Scanning of the other hyperband may also be based on other scanning techniques, such as the wideband scanning technique defined by the TIA/EIA-136-123 standard.

If the mobile terminal 100 did not find an SP in the current band of the other hyperband (block 250), the mobile terminal 100 determines if additional default bands exist for the other hyperband (e.g., if not band "F" of the 1900 MHz spectrum, advance to the next default band) (block 252). If not the last band, the mobile terminal 100 sets the current band to the next default band defined in the temporary IRDB (block 254), resets the timer (block 256), and repeats processing for the current band (blocks 244 up to 272). If there are no default bands remaining (block 252), the mobile terminal 100 continues camping on the control channel of the SP in the current hyperband it was camping on when it began scanning the other hyperband (block 258), and current scan processing ends (block 234). As with the scanning in FIG. 5, scanning in the other hyperband is performed by the mobile terminal 100 in the background, does not cause the mobile terminal 100 to lose service on the current control channel in the current hyperband, and is transparent to the user of the mobile terminal 100.

Figure 7A:
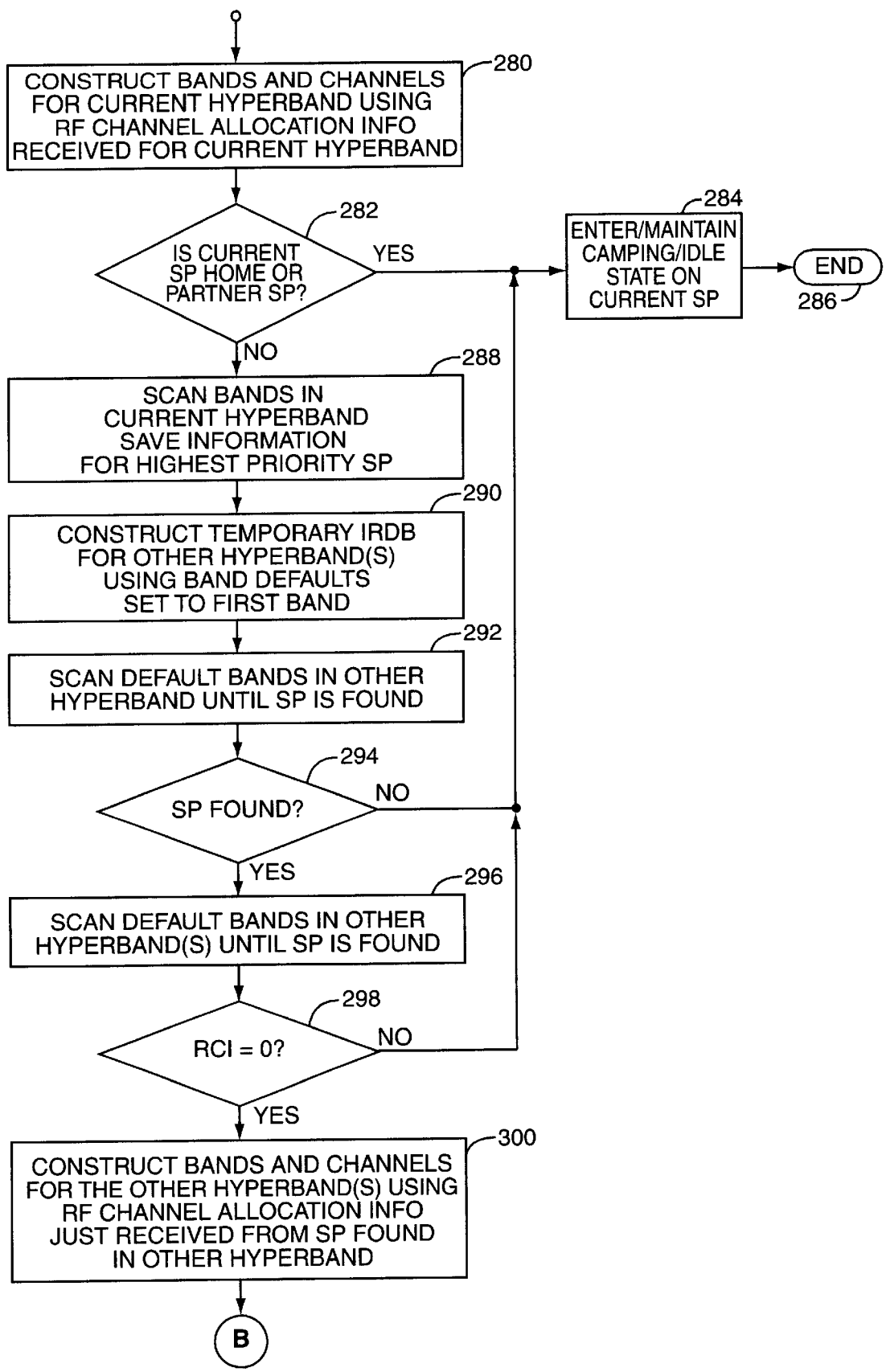
FIGS. 7A and 7B are logic flow diagrams for the combined current/other hyperband scanning operations introduced in FIG. 4.
Figure 7B:
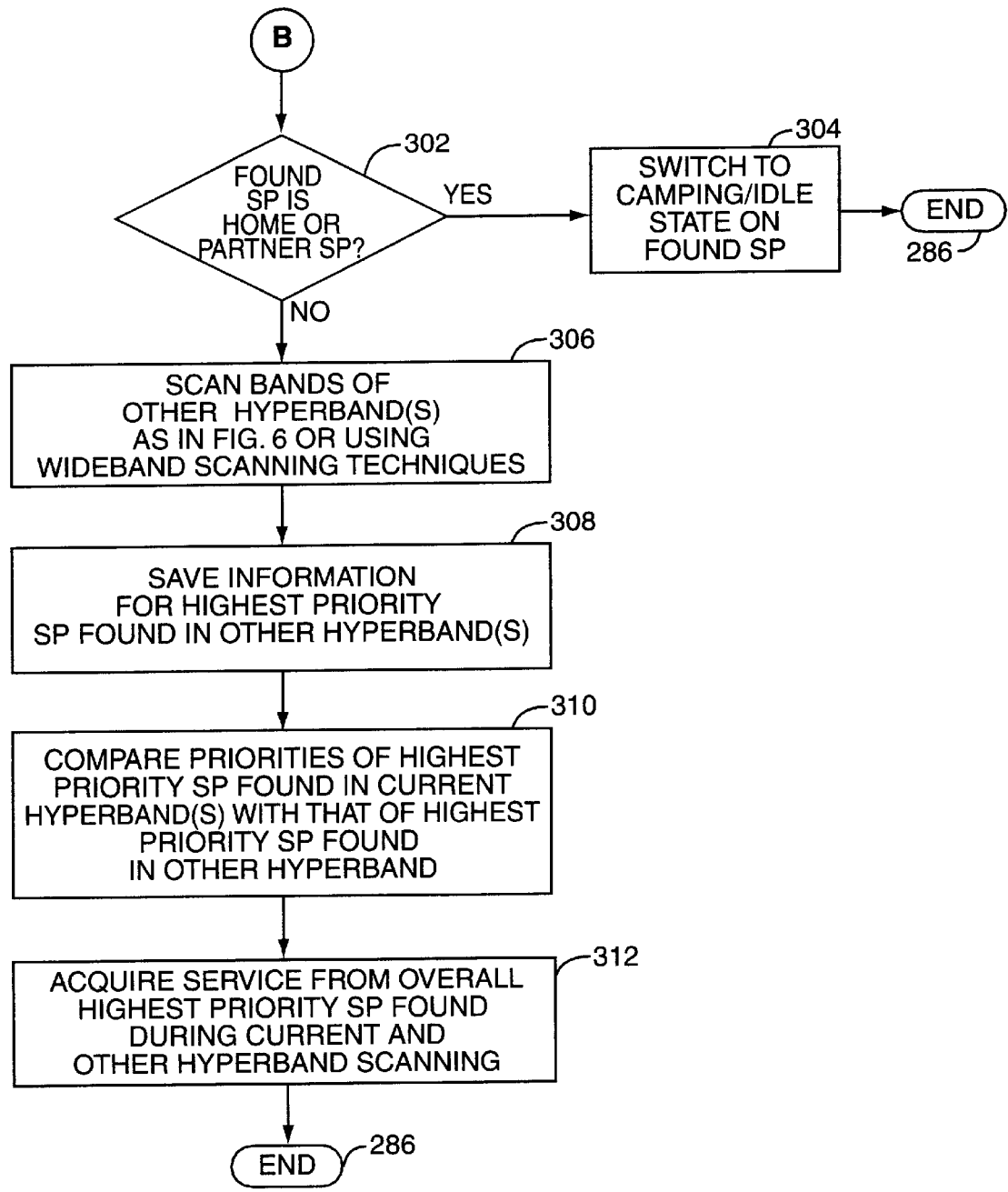

FIGS. 7A and 7B are flow diagrams of Combined Current and Other Hyperband Triggered Partial Scanning operations (FIG. 4, block 214). Scanning details for the current hyperband are in accordance with the discussion of FIG. 5 above, while scanning details for the other hyperband are in accordance with the discussion of FIG. 6 above. The mobile terminal 100, operating in the current hyperband, receives an indication that the current hyperband uses a non-standard spectrum allocation to support greater than the default number of service providers (e.g., RCI=0). Processing begins with the mobile terminal 100 constructing the non-standard bands and channel allocations for the current hyperband according to the received message's RF channel allocation information (block 280). If the current SP is a home or partner SP (block 282), the mobile terminal 100 enters/maintains its camping or idle state on the current control channel (block 284), and the current scan processing ends (block 286).

If the current SP is not a home or partner SP (block 282), the mobile terminal 100 scans the current hyperband using the constructed band and channel information, saving relevant information for any higher priority SPs it finds (block 288). The mobile terminal 100 then constructs default band information for the other hyperband (block 290). The mobile terminal 100 then scans the other hyperband using the default band/channel information until the first SP in the other hyperband is found (block 292). If an SP is found (block 294), the mobile terminal monitors a control channel of that found SP long enough to receive the Regulatory Control Message or equivalent message (block 296). If this message indicates that this other hyperband supports only the standard number of SPs, based on the standard band definitions for the other hyperband (block 298), the mobile terminal 100 continues camping on its current control channel (block 284), and the current scan processing ends (block 286).

However, if the received message indicates that the other hyperband uses a non-stndard spectrum allocation with more than the standard number of SPs available (block 298), the mobile terminal 100 constructs band and channel information for the non-standard spectrum allocation using the RF channel allocation information in the received message (block 300). Processing continues with the mobile terminal 100 determining whether the first SP it found in the other hyperband is a home or partner SP (block 302). If so, the mobile terminal 100 switches from the current control channel in the current hyperband to a control channel of this home or partner SP in the other hyperband (block 304), and the current scanning operations end (block 286).

If the first SP found in the other hyperband is not a home or partner SP (block 302), the mobile terminal 100 uses the constructed band and channel information to scan for higher priority SPs in the other hyperband (block 308). This scanning of the other hyperband may be in accordance with the current band scanning operations of FIG. 5, or may be based on other scanning techniques, such as the wideband scanning defined by the TIA/EIA-136 standard.

After scanning the current hyperband and the other hyperband, the mobile terminal 100 determines the overall highest priority SP found (block 310). The mobile terminal 100 then acquires service on a control channel associated with the highest priority SP, whether that SP is in the current hyperband or in the other hyperband (block 312), and the current scan processing ends (block 286). Note that the logic of FIGS. 5–7 may be repeated anytime the Regulatory Control Message, or equivalent message, changes. That is, once the mobile terminal 100 has responded to the RCI=0 condition and acquired or maintained service on the highest priority SP available, it may maintain that service, avoiding further current or other triggered hyperband scans until the Regulatory Control Message indicates that different or additional SPs are available.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling a mobile terminal, the method comprising:

receiving a message through a control channel associated with a current service provider in a current hyperband indicating that said current hyperband in which said mobile terminal is operating uses a non-standard spectrum allocation to support additional service providers;

generating updated scanning information for said current hyperband based on RF channel allocation information in said message;

if said service provider is not the highest priority service provider defined, scanning based on said updated scanning information to find higher priority service providers, while maintaining service on said current control channel; and acquiring service on a control channel associated with a higher priority service provider in response to finding at least one said higher priority service provider during scanning.

2. The method of claim 1 wherein generating said updated scanning information for said current hyperband based on said RF channel allocation information in said message comprises organizing a scanning database stored in said mobile terminal for said current hyperband in accordance with RF channel allocations by service provider defined in said message.

3. The method of claim 2 wherein organizing said scanning database stored in said mobile terminal for said current hyperband in accordance with said RF channel allocations by service provider defined in said message comprises structuring an intelligent roaming database stored in said mobile terminal in accordance with said RF channel allocations.

4. The method of claim 1 further comprising restoring default scanning information defining default service band and RF channel allocations in response to receiving a subsequent message indicating that said current hyperband is based on a predefined standard spectrum allocation.

5. The method of claim 2 further comprising operating said mobile terminal in accordance with TIA/EIA-136 standards, and wherein said message comprises a Regulatory Control Message with a Regulatory Control Indicator value of zero.

6. The method of claim 5 further comprising receiving said RF channel allocation information as part of said Regulatory Control Message.

7. The method of claim 1 wherein scanning based on said updated scanning information to find said higher priority service providers, while maintaining service on said current control channel comprises:

finding unidentified service providers operating in said current hyperband; and saving service provider information for each unidentified service provider found in said current hyperband with a higher priority than said current service provider.

8. The method of claim 7 further wherein finding said unidentified service providers operating in said current hyperband comprises using defined RF channel prioritization information to speed finding said unidentified service providers operating in said current hyperband.

9. The method of claim 1 wherein scanning based on said updated scanning information to find said higher priority service providers comprises scanning through a plurality of bands comprising said current hyperband, each band allocated to a different service provider in said current hyperband, using defined RF channel priority information to speed scanning operations.

10. The method of claim 1 further comprising receiving periodic paging messages from said current service provider on said current control channel while performing said scanning of said current hyperband based on said updated band and channel information.

11. A method of controlling a mobile terminal, the method comprising:

receiving a first message through a current control channel associated with a current service provider within a current hyperband indicating that said current hyperband in which said mobile terminal is operating uses a non-standard spectrum allocation to support additional service providers;

searching at least one alternate hyperband using default band and channel allocation information defined for said at least one alternate hyperband for other service providers;

receiving a second message from a first found service provider in said at least one alternate hyperband;

if said second message indicates said at least one alternate hyperband uses a non-standard spectrum allocation to support additional service providers, generating updated scanning information for said alternate hyperband based on RF channel allocation information in said second message;

scanning said alternate hyperband based on said updated scanning information for service providers with a higher priority than said current service provider, while maintaining service on said current control channel; and acquiring service on a higher priority service provider in response to finding said higher priority service provider in said alternate hyperband.

12. The method of claim 11 further comprising operating said mobile terminal in accordance with TIA/EIA-136 standards, and wherein receiving said first and second messages comprises receiving first and second Regulatory Control Messages.

13. The method of claim 12 further comprising receiving RF channel allocation information identifying RF channel allocations by service provider for said current hyperband as part of said first Regulatory Control Message and receiving RF channel allocation information identifying RF channel allocations by service provider for said alternate hyperband as part of said second Regulatory Control Message.

14. The method of claim 11 further comprising prioritizing searching of RF channels in said at least one alternate hyperband based on said default band and channel allocation information defined for said at least one alternate hyperband.

15. The method of claim 11 wherein said default band and channel allocation information defines a band order and said at least one alternate hyperband comprises at least two related alternate service bands, and further comprising prioritizing searching said at least two related alternate service bands for said other service providers based on said band order.

16. The method of claim 11 further comprising:

determining if said first found service provider is a home service provider;

if said first found service provider is a home service provider, discontinuing scanning said alternate hyperband; and changing from said current service provider in said current hyperband to said first found service provider in said alternate hyperband.

17. The method of claim 11 wherein if said second message indicates said at least one alternate hyperband does not use a non-standard spectrum allocation to support additional service providers, ending scanning operations for said at least one alternate hyperband.

18. The method of claim 11 further comprising maintaining a timer to time scanning operations in said alternate hyperband, whereby upon repeated expiration of said timer, successive portions of said scanning operations in said alternate hyperband are completed so that said mobile terminal maintains service with said current service provider in said current hyperband.

19. The method of claim 11 further comprising generating a temporary scanning database in said mobile terminal based on said RF channel allocation information in said second message.

20. The method of claim 19 further comprising searching said alternate hyperband for said service providers with a higher priority than said current service provider based on said temporary scanning database.

21. A method of controlling a mobile terminal, the method comprising:

receiving a first message through a current control channel associated with a current service provider in a current hyperband indicating that said current hyperband in which said mobile terminal is operating uses a non-standard spectrum allocation to support additional service providers;

if said current service provider is not a home service provider, scanning at least one of said current hyperband and an alternate hyperband to find higher priority service providers, while maintaining service on said current control channel;

identifying a highest priority service provider among said higher priority service providers if at least one said higher priority service provider is found; and acquiring service on a control channel associated with said highest priority service provider, wherein said highest priority service provider becomes the new current service provider.

22. The method of claim 21 further comprising:

identifying forbidden service providers based on service provider information received from service providers found during scanning said at least one of said current hyperband and said alternate hyperband to find said higher priority service providers; and omitting RF channels assigned to said forbidden service providers from subsequent scanning operations to find higher priority service providers.

23. The method of claim 21 wherein the hyperband corresponding to said new current service provider is considered the new current hyperband, and the remaining hyperband is considered the new alternate hyperband, and further comprising scanning at least one of said new current and alternate hyperbands and acquiring service from a new higher priority service provider, if found, in response to receiving a subsequent message from said new current service provider indicating a change in spectrum allocation in said new current hyperband.

24. The method of claim 21 wherein scanning at least one of said current hyperband and said alternate hyperband to find higher priority service providers comprises:

generating a scanning database with RF channel allocations by service provider for said current hyperband based on RF channel allocation information in said first message;

scanning said current hyperband based on said scanning database to read service provider information for each unidentified service provider in said current hyperband; and saving said service provider information for each service provider found with a higher priority than said current service provider.

25. The method of claim 21 wherein scanning at least one of said current hyperband and said alternate hyperband to find higher priority service providers comprises:

searching at least one alternate service band associated with said alternate hyperband for other service providers;

receiving a second message from a first found service provider in said at least one alternate service band;

if said second message indicates that said alternate hyperband uses a non-standard spectrum allocation to support additional service providers, generating an updated scanning database with RF channel allocations by service provider for said alternate hyperband based on RF channel allocation information in said second message;

scanning said alternate hyperband based on said updated scanning database to read service provider information for each unidentified service provider in said alternate hyperband; and saving said service provider information for each service provider found with a higher priority than said current service provider.

26. The method of claim 21 wherein said current hyperband is one of a 800 MHz hyperband and a 1900 MHz hyperband in a TIA/EIA-136 system, and said alternate hyperband is a remaining one of said 800 MHz and 1900 MHz hyperbands, and further comprising:

monitoring Regulatory Control Messages from said current service provider in a current service area; and performing said scanning as a background task of said mobile terminal whenever one of said Regulatory Control Messages identifies service provider changes in said current hyperband; and acquiring service from a highest priority one of said higher priority service providers in one of said current and alternate hyperbands in response to finding a higher priority service provider during said scanning of at least one of said current and alternate hyperbands.

27. The method of claim 21 further comprising:

generating a scanning database within said mobile terminal corresponding to said current hyperband in accordance with service provider channel allocation information in said first message in response to receiving said first message; and restoring default channel allocation information in said scanning database in response to receiving a subsequent message indicating that said current hyperband uses a standard spectrum allocation.

* * * * *